(12) United States Patent
Voigt

(10) Patent No.: US 7,782,018 B2
(45) Date of Patent: Aug. 24, 2010

(54) ADAPTIVE CURRENT LIMITING FOR ANY POWER SOURCE WITH OUTPUT EQUIVALENT SERIES RESISTANCE

(75) Inventor: Martin Palle Voigt, Gistrup (DK)

(73) Assignee: Maxim Integrated Products, Inc., Sunnyvale, CA (US)

(*) Notice: Subject to any disclaimer, the term of this patent is extended or adjusted under 35 U.S.C. 154(b) by 163 days.

(21) Appl. No.: 12/203,357

(22) Filed: Sep. 3, 2008

(65) Prior Publication Data

US 2009/0092387 A1   Apr. 9, 2009

Related U.S. Application Data

(60) Provisional application No. 60/971,184, filed on Sep. 10, 2007.

(51) Int. Cl.
*H02J 7/00* (2006.01)
(52) U.S. Cl. ............... 320/135; 320/136; 396/205; 396/206
(58) Field of Classification Search .......... 320/135, 320/136; 396/205, 206
See application file for complete search history.

(56) References Cited

U.S. PATENT DOCUMENTS

| | | | |
|---|---|---|---|
| 4,025,935 A | 5/1977 | Wagensonner et al. | |
| 4,210,855 A | 7/1980 | Harer et al. | |
| 4,237,385 A | 12/1980 | Jurgens et al. | |
| 5,065,083 A | 11/1991 | Owens | |
| 5,130,633 A | 7/1992 | Maruchi | |
| 5,477,124 A | 12/1995 | Tamai | |
| 5,670,862 A | 9/1997 | Lewyn | |
| 5,963,255 A | 10/1999 | Anderson et al. | |
| 5,986,359 A | 11/1999 | Enderich et al. | |
| 6,028,374 A | 2/2000 | Razak | |
| 6,040,682 A | 3/2000 | Kaneda | |
| 6,188,142 B1 | 2/2001 | Loth-Krausser | |
| 6,233,016 B1 | 5/2001 | Anderson et al. | |
| 6,691,048 B2 | 2/2004 | Yano | |

(Continued)

FOREIGN PATENT DOCUMENTS

JP   2003-348197   12/2003

(Continued)

OTHER PUBLICATIONS

"International Search Report and Written Opinion of the International Searching Authority Dated Feb. 11, 2009", International Application No. PCT/US2008/075643.

*Primary Examiner*—Jay M Patidar
*Assistant Examiner*—Ramy Ramadan
(74) *Attorney, Agent, or Firm*—Blakely Sokoloff Taylor & Zafman LLP

(57) ABSTRACT

Adaptive current limiting for any power source to limit power drain of one load on the power source to maintain a minimum power source voltage for proper operation of other loads on the power source. For battery applications, such as for flash systems, the invention allows the maximum output current of a boost converter to be utilized without having to calculate the system equivalent series resistance first. The invention also adjusts the current load up or down during a high load event to compensate for changes in other loads. The changes in current load are made in increments, with a hysteresis region avoiding constant up and down incrementing. Various embodiments are disclosed.

12 Claims, 8 Drawing Sheets

U.S. PATENT DOCUMENTS

| | | |
|---|---|---|
| 6,815,930 B2 | 11/2004 | Goodman |
| 6,922,151 B2 | 7/2005 | Kawakami |
| 6,967,467 B2 * | 11/2005 | Riley et al. ................. 320/135 |
| 6,998,818 B2 | 2/2006 | Xiong et al. |
| 7,120,500 B1 | 10/2006 | Seligman |
| 7,622,898 B2 * | 11/2009 | Shimizu et al. ............. 320/166 |
| 2006/0050910 A1 | 3/2006 | Danielsen |
| 2006/0233405 A1 | 10/2006 | Brooks et al. |
| 2006/0269082 A1 | 11/2006 | Danielsen et al. |
| 2007/0029975 A1 | 2/2007 | Martin et al. |

FOREIGN PATENT DOCUMENTS

| | | |
|---|---|---|
| JP | 2004-014329 | 1/2004 |

* cited by examiner

ADAPTIVE CURRENT LIMITING FOR ANY POWER SOURCE WITH OUTPUT EQUIVALENT SERIES RESISTANCE

CROSS-REFERENCE TO RELATED APPLICATION

This application claims the benefit of U.S. Provisional Patent Application No. 60/971,184 filed Sep. 10, 2007.

BACKGROUND OF THE INVENTION

1. Field of the Invention

The present invention relates to the field of battery load management in battery powered systems.

2. Prior Art

In various battery powered devices, there are a number of subsystems that need power. Typically at least one of the subsystems can operate at a reduced power if necessary. Such devices include devices with a camera flash, using a Xenon or LED Flash element, including cell phones, and TDMA transmission systems, where a capacitor is charged to provide power amplifier power during the TDMA transmission burst.

Taking devices with a camera flash, it is desirable to charge the flash capacitor as quickly as possible. However during high load currents, the system voltage will momentarily drop due to the internal ESR (equivalent series resistance) of the battery, together with any serial impedance between the battery and the load. For equipment requiring a minimum voltage for stable operation, the ESR of the system (battery plus serial impedance) needs to be calculated in order to estimate the maximum current that can be drawn from the battery without causing system voltage drop below the threshold for stable operation.

If the above is not done, then two scenarios are possible:

1. The system cut-off voltage, a pre-determined voltage at which the system ceases operation and powers down, will have to be set artificially high, to provide sufficient margin above the point at which the battery no longer reliably operates. The result is reduced operating time.

2. In a cell phone, high current peaks cause erratic behavior, or possibly even phone shut-off, even though the battery has plenty of remaining capacity.

For the foregoing reasons, it is desirable to limit the battery current drain of flash capacitor charging systems, when necessary, to below the nominal design value to maintain the required battery voltage for operation of other subsystems, thereby extending the useful battery life, or time between charges for rechargeable batteries.

In the prior art, additional hardware and software were added. The hardware added is a high precision high speed ADC. During the initial loading of the system, the voltage drop of the battery is measured with the ADC, and using software the battery ESR is calculated, from which the maximum load that the battery is able to support is determined.

DETAILED DESCRIPTION OF THE PREFERRED EMBODIMENTS

For battery applications, the invention allows the maximum output current of a boost converter to be utilized without having to first calculate the system equivalent series resistance (ESR). As mentioned before, this is useful in the applications such as:

1. A camera flash, using a Xenon or an LED Flash element.

2. TDMA (Time Division Multiple Access) transmission systems, where a capacitor is charged to provide power amplifier power during the TDMA transmission burst.

An exemplary method, referred to herein as MAXFLASH, eliminates the need for measuring battery ESR during FLASH/MOVIE events in battery powered equipment.

Figure 1:
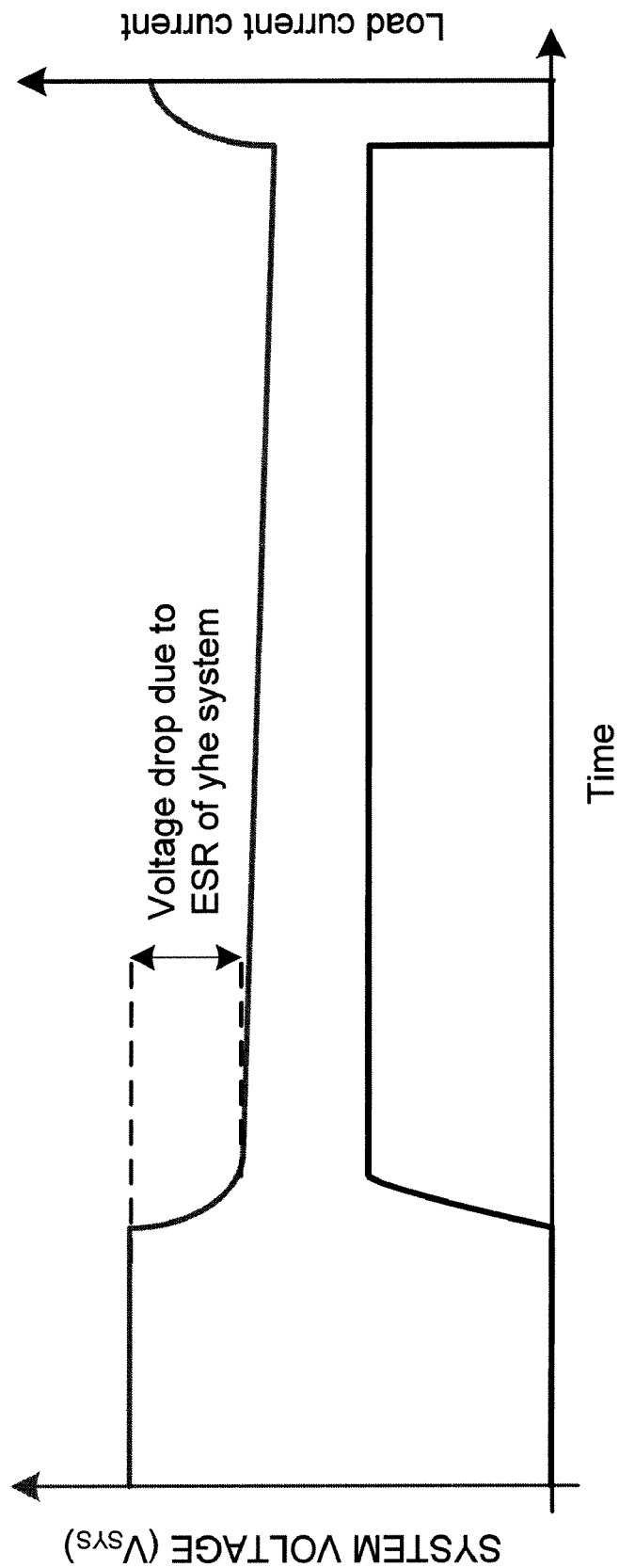
FIG. 1 illustrates system voltage drop due to System ESR (equivalent series resistance) of the battery and line impedances.

FIG. 1 shows the voltage drop due to system ESR. For applications like a camera flash or a movie light (also referred to as torch light), the system ESR should be measured in order to calculate the maximum current that can be consumed by the flash in order to ensure that at the end of the flash, the system voltage has not dropped below the minimum required system voltage for the remaining system (cut-off voltage).

Figure 2:
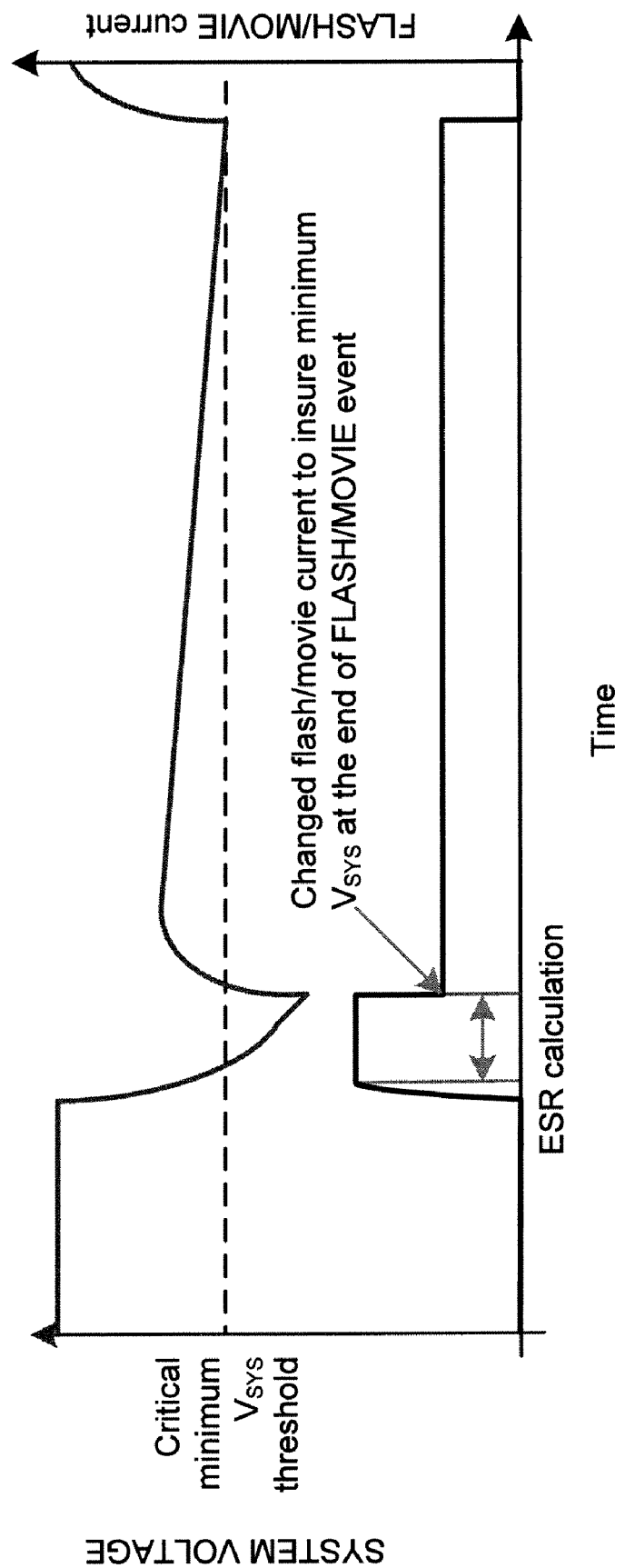
FIG. 2 illustrates the use of an ESR calculation to insure minimum system voltage at the end of FLASH/MOVIE event normal case.

Battery cell ESR depends on battery chemistry, load current, temperature, and age of the cell. For these reasons, ESR must be calculated on a real-time basis in order to get the most accurate determination. In most systems, the camera flash is triggered by the camera module itself. Therefore the battery ESR has to be measured in real time during the beginning of the flash event. FIG. 2 illustrates the use of a ESR calculation to insure minimum system voltage at the end of FLASH/MOVIE event normal case.

Figure 3:
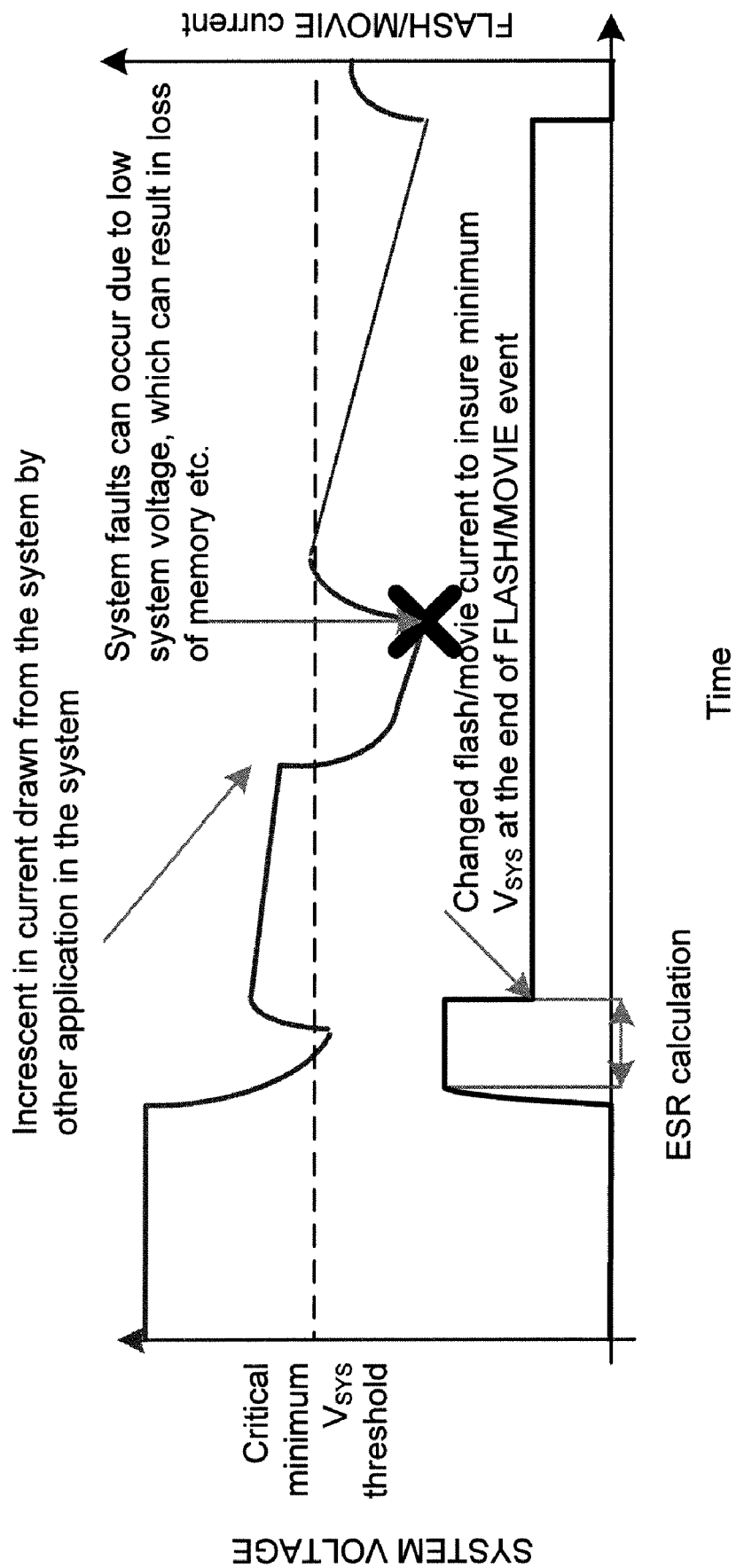
FIG. 3 illustrates the use of an ESR calculation at the beginning of an FLASH/MOVIE event to insure minimum system voltage at the end of FLASH/MOVIE event, with additional load event during FLASH/MOVE event.

Since most systems contain many complex functions that operate independent of each other, the load current might change during the FLASH/MOVIE duration. If other loads within the system start drawing significantly more current during the FLASH/MOVE duration, this can cause the system voltage to drop below the minimum required operation voltage for the system, hence causing spurious events. This is illustrated in FIG. 3, which shows the use of an initial ESR calculation to insure minimum system voltage at the end of the FLASH/MOVIE event, with additional load events during the FLASH/MOVE event.

Figure 4:
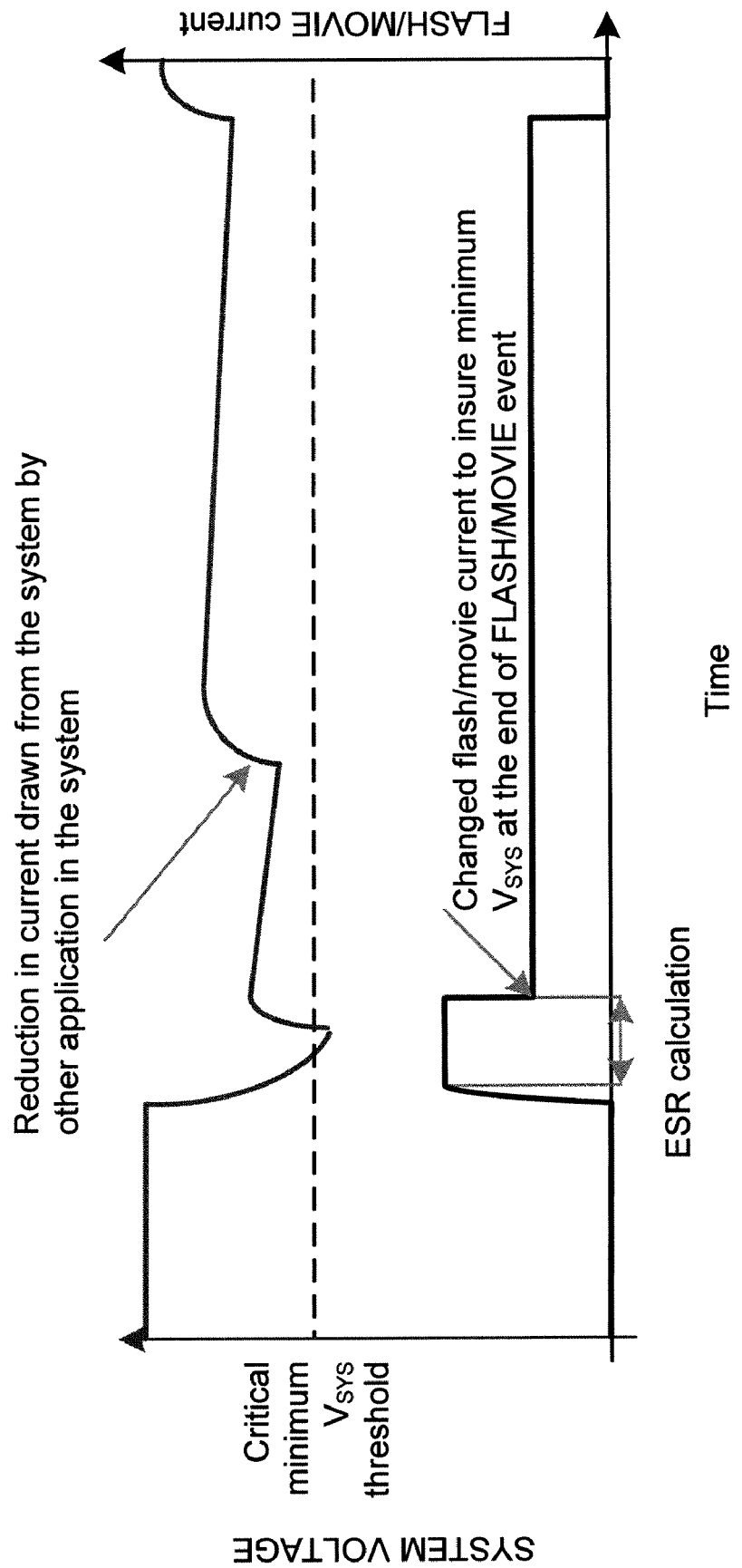
FIG. 4 illustrates the use of an ESR calculation to insure minimum system voltage at the end of FLASH/MOVIE event with load release during FLASH/MOVIE event.

On the other hand, if an application is going from a high current mode to a lower current mode during the FLASH/MOVIE event, the battery voltage at the end of the FLASH/MOVE duration will be above the minimum battery voltage. This means that the actual FLASH/MOVIE current could have been set higher for the remaining duration, allowing the highest possible output current to be utilized. This is illustrated in FIG. 4, which shows the use of an initial ESR calculation to insure minimum system voltage at the end of the FLASH/MOVIE event with load release during the FLASH/MOVIE event.

Figure 5:
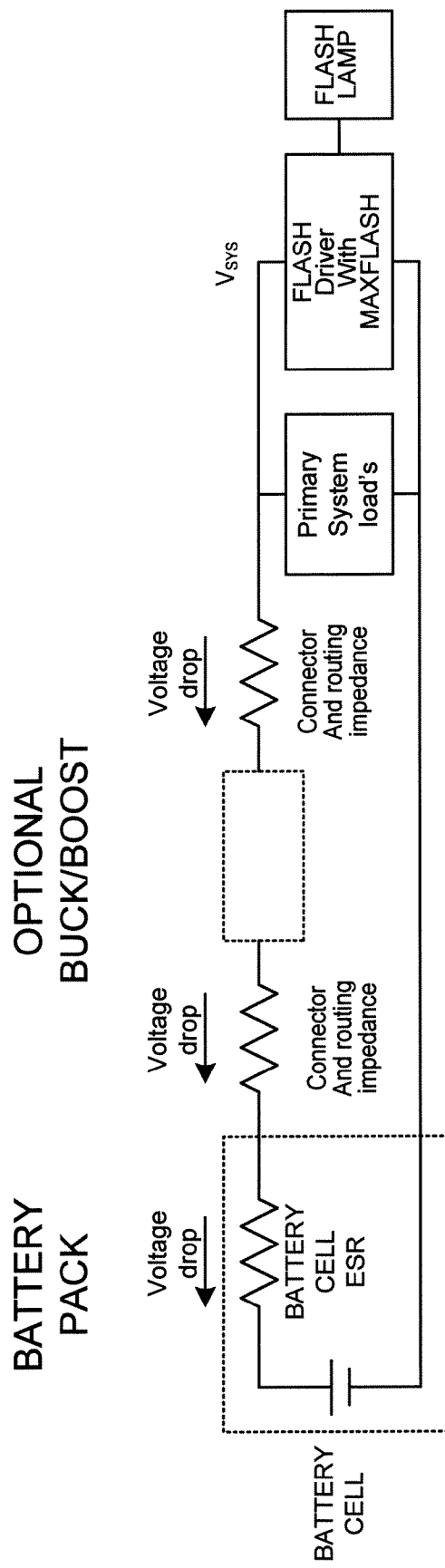
FIG. 5 illustrates the use of a flash driver with MAX-FLASH adjusting FLASH current in a battery operated system having an optional buck/boost switching regulator.
Figure 6:
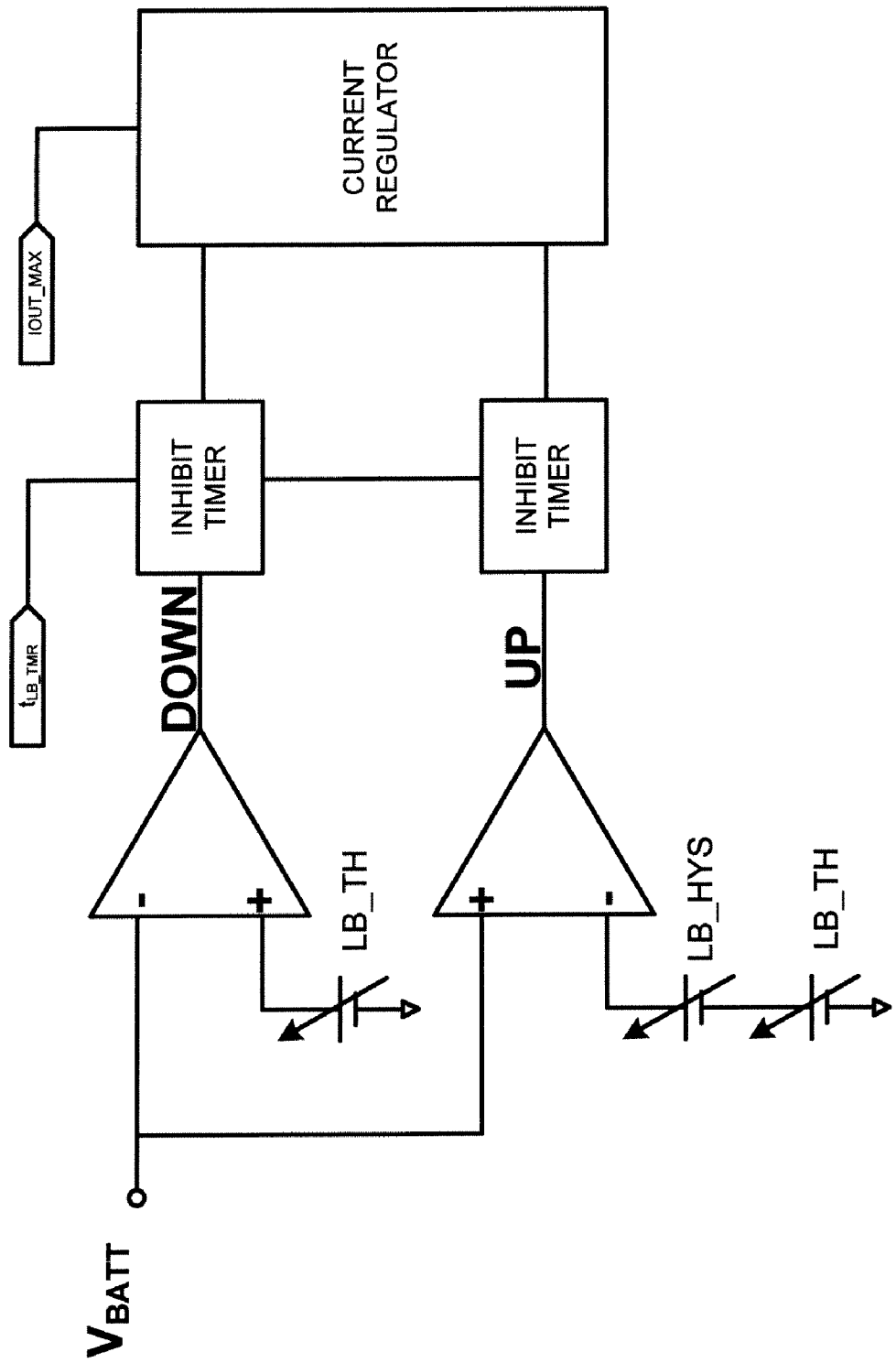
FIG. 6 is a block diagram illustrating a preferred implementation of the MAXFLASH function.
Figure 7:
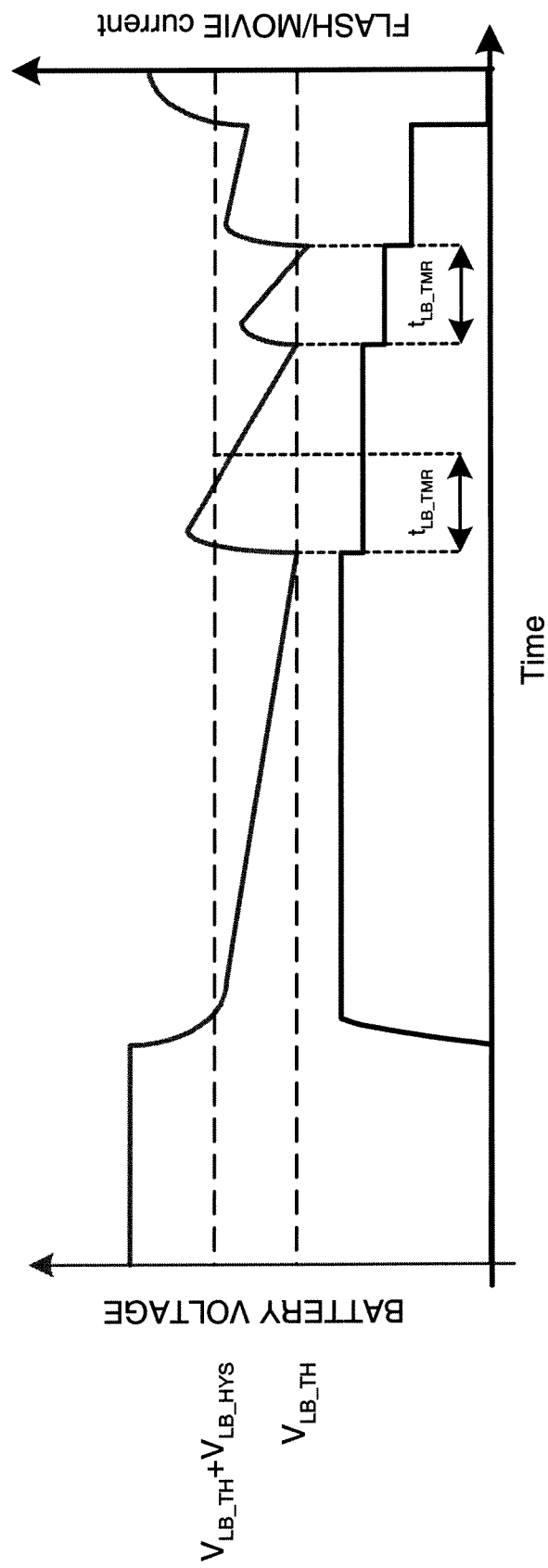
FIG. 7 illustrates the MAXFLASH function operation with increasing system loads during the FLASH/MOVIE event.
Figure 8:
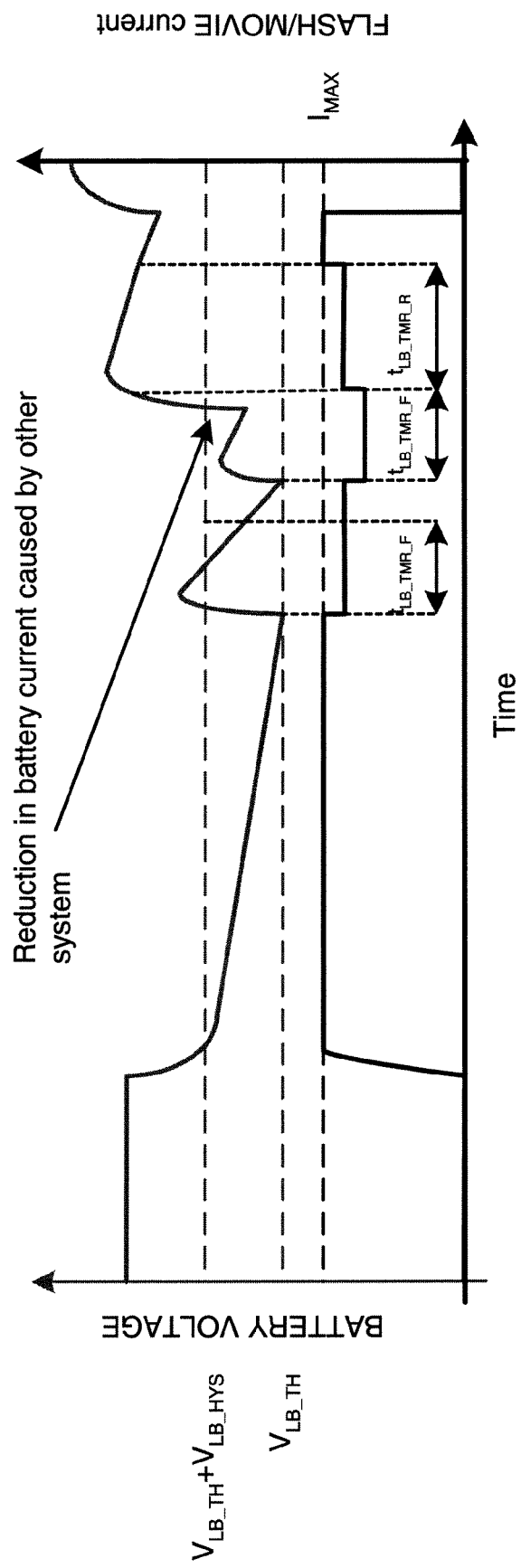
FIG. 8 illustrates the MAXFLASH function operation with decreasing system loads during the FLASH/MOVIE event.

FIG. 5 illustrates a system using MAXFLASH for adjusting the FLASH driver current to maintain adequate operating voltages for the rest of the system. FIG. 6 shows a block diagram of the MAXFLASH to control the current IOUT_MAX provided to the charging circuit for the driver output storage capacitor, in this case to power a flash lamp, and FIGS. 7 and 8 show examples of MAXFLASH operation. To avoid having to measure the ESR of the system and still achieve the goal of ensuring that the system voltage doesn't drop below a predefined threshold, the circuit of FIG. 6 operates as follows (see FIGS. 7 and 8): During a FLASH/MOVIE event the input voltage of the device is monitored using a Kelvin connection to the system rail, referred to as $V_{SYS}$ or $V_{BATT}$. If the input voltage drops below a predefined threshold, referred to as $V_{LB\_TH}$ as sensed by comparator CP1, this is an indication that the FLASH/MOVIE event is drawing more current than the system can support.

As a reaction to this, the current regulator driving the FLASH/MOVIE will reduce (DOWN) the output current one step (LSB). This will reduce the input current to the current regulator driving the FLASH/MOVIE, hence reducing the total current drawn from the system battery. Since the system current is now reduced, the battery voltage will start to rise due to the internal ESR of the battery cell and remaining system. The current regulator will then delay (INHIBIT TIMER) a user predefined time, referred to as $t_{LB\_TMR\_F}$, for falling edge detection (i.e. battery voltage less than $V_{LB\_TH}$), and $t_{LB\_TMR\_R}$ for raising edge detection (i.e. battery voltage greater than $V_{LB\_TH}+V_{LB\_HYS}$, sensed by comparator CP2).

The battery voltage is then sampled again and compared to $V_{LB\_TH}$. If the battery voltage is still below the $V_{LB\_TH}$ threshold, the current regulator will be caused to reduce output current one unit once again to insure that minimum battery voltage is available for the remaining parts of the system. If the battery voltage rises above the $V_{LB\_TH}$ threshold plus a user defined hysteresis, referred to as $V_{LB\_HYS}$, the Current Regulator will be caused to increase (UP) the output current one unit (LSB), but only if the output current is less than the user defined output current. A DOWN or UP increment in the preferred embodiment resets both inhibit timers to initiate new time delays, though this is not a limitation of the invention.

The delays $t_{LB\_TMR\_F}$ and $t_{LB\_TMR\_R}$ may be the same or different time periods, and are typically, though not necessarily, in the range of seconds to milliseconds. These delays may be in hardware or under program control by the system processor. Note from FIGS. 7 and 8 that the delays are minimum delays before the circuit is responsive to the system voltage again, after which the circuit will immediately respond to a system voltage going below $V_{LB\_TH}$ threshold or above $V_{LB\_TH}$ threshold plus $V_{LB\_HYS}$ hysteresis. Alternatively, the system voltage could be periodically sampled, and current increased or decreased in increments as in the preferred embodiment. Sampling as used herein means responding to the output of the comparators, and not necessarily initially sensing the battery voltage or the output of the comparators. Also, while the preferred embodiment shown in FIG. 6, once the time delays are programmed and typically permanently stored, functions without system processor intervention, the sampling and/or increasing or decreasing the current drain could be done under system processor control, though this generally is undesirable.

The unit reduction and the unit increase in converter output may be the same or different, as desired. If the same however, the increments should have an effect on the battery voltage of less than $V_{LB\_HYS}$, as otherwise a voltage decline to $V_{LB\_TH}$ would cause a battery voltage change to over $V_{LB\_TH}+V_{LB\_HYS}$, with the next change bringing the battery voltage back to $V_{LB\_TH}$, or lower. Instead, the effect of a unit reduction in the converter output current on battery voltage should be less than $V_{LB\_HYS}$ and repeated often enough to keep the battery voltage from going below $V_{LB\_TH}$. Alternatively, the unit reduction in the converter output current should be more than the unit increase in the converter output current, so that a unit reduction in the converter output current followed by a unit increase in the converter output current will not bring the battery voltage back to where it was before these two changes occurred.

The one-LSB-at-a-time up/down adjustment will continue for the entire duration of the FLASH/MOVIE event, ensuring that, by way of example, the FLASH/MOVIE output current is always maximized for the specific operating conditions, regardless of the changing loads on the battery during the event.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of maintaining a minimum system voltage in a battery operated system having a component preferably operated at a first current, but operable with currents less than the first current, comprising:
   1) sensing system voltage; and,
   2) when the system voltage falls below the predefined threshold, incrementally decreasing the current provided to the component; and
   3) when the system voltage goes above the predefined threshold plus a hysteresis voltage, incrementally increasing the current provided to the component; and,
   4) if the system voltage falls below the predefined threshold after a first predefined time period after the incremental decrease in current, again incrementally decreasing the current provided to the component; and,
   5) if the system voltage goes above the predefined threshold plus the hysteresis voltage increment after a second predefined time period after the incremental increase in current, again incrementally increasing the current provided to the component;
   6) repeating 4) and 5) multiple times.

2. The method of claim 1 wherein the first and second time periods are unequal time periods.

3. The method of claim 1 wherein the first and second time periods are equal time periods.

4. The method of claim 1 wherein the incremental decrease in current in 2) is equal to the incremental increase in current in 3).

5. The method of claim 1 wherein the incremental decrease in current in 2) is not equal to the incremental increase in current in 3).

6. The method of claim 1 wherein on each subsequent repeat of 4) and 5), the current is incrementally decreased when the system voltage falls below the predefined threshold at any time after the first predefined time period after the incremental decrease or increase in current, or the current is incrementally increased when the system voltage is above the predefined threshold plus the hysteresis voltage at any time after the second predefined time period after the incremental increase in current.

7. A method of maintaining a minimum system voltage in a battery operated system having a component preferably operated at a first current, but operable with currents less than the first current, comprising:
  a) sensing system voltage; and,
    1) when the system voltage falls below a predefined threshold, incrementally decreasing the current provided to the component; and
    2) when the system voltage goes above the predefined threshold plus a hysteresis voltage, incrementally increasing the current provided to the component; and,
  b) after the incremental decrease or the incremental decrease in current;
    1) if the system voltage falls below the predefined threshold after a first predefined time period after the incremental decrease or the incremental increase in current, incrementally decreasing the current provided to the component; and,
    2) if the system voltage goes above the predefined threshold plus the hysteresis voltage component after a second predefined time period after the incremental decrease or the incremental increase in current, incrementally increasing the current provided to the component;
  c) repeating b) multiple times.

8. The method of claim 7 wherein the first and second time periods are unequal time periods.

9. The method of claim 7 wherein the first and second time periods are equal time periods.

10. The method of claim 7 wherein the incremental decrease in current in b), 1) is equal to the incremental decrease in current in b), 2).

11. The method of claim 7 wherein the incremental decrease in current in b), 1) is not equal to the incremental decrease in current in b), 2).

12. The method of claim 7 wherein on each subsequent repeat of b), the current is incrementally decreased when the system voltage falls below the predefined threshold at any time after the first time period, or the current is incrementally increased when the system voltage is above the predefined threshold plus a hysteresis voltage at any time after the second time period.

* * * * *

UNITED STATES PATENT AND TRADEMARK OFFICE
CERTIFICATE OF CORRECTION

| | |
|---|---|
| PATENT NO. | : 7,782,018 B2 |
| APPLICATION NO. | : 12/203357 |
| DATED | : August 24, 2010 |
| INVENTOR(S) | : Voigt |

It is certified that error appears in the above-identified patent and that said Letters Patent is hereby corrected as shown below:

Column 5,
Line 14, please delete "decrease in current" and insert --increase in current--.

Signed and Sealed this
Eighth Day of March, 2011

David J. Kappos
*Director of the United States Patent and Trademark Office*